(12) United States Patent
Halfmann et al.

(10) Patent No.: US 7,528,710 B2
(45) Date of Patent: May 5, 2009

(54) DEVICE FOR COMMUNICATING WITH A SYSTEM

(75) Inventors: Ulrich Halfmann, Bräuningshof (DE); Shimei Liu, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 620 days.

(21) Appl. No.: 11/253,157

(22) Filed: Oct. 18, 2005

(65) Prior Publication Data
US 2006/0097860 A1 May 11, 2006

(30) Foreign Application Priority Data
Oct. 19, 2004 (DE) .................... 10 2004 050 908

(51) Int. Cl.
*B60Q 1/00* (2006.01)
(52) U.S. Cl. .................. 340/459; 340/438; 340/531; 455/462; 455/461; 455/445; 455/567; 455/558
(58) Field of Classification Search .............. 455/462, 455/461, 445, 567, 558
See application file for complete search history.

(56) References Cited

U.S. PATENT DOCUMENTS

| | | | |
|---|---|---|---|
| 6,546,262 B1 * | 4/2003 | Freadman | ........... 455/557 |
| 6,697,681 B1 | 2/2004 | Stoddard et al. | |
| 2004/0129522 A1 | 7/2004 | Skowronski | |
| 2004/0260426 A1 | 12/2004 | Johannessen et al. | |
| 2005/0119014 A1 * | 6/2005 | Bandell et al. | ........... 455/462 |
| 2005/0141681 A1 | 6/2005 | Graiger | |

FOREIGN PATENT DOCUMENTS

| | | |
|---|---|---|
| DE | 3813590 A1 | 11/1988 |
| DE | 102 96 624 T5 | 4/2004 |
| DE | 103 44 358 A1 | 5/2005 |
| WO | 0171878 A1 | 9/2001 |
| WO | 03088011 A2 | 10/2003 |

* cited by examiner

*Primary Examiner*—David Q Nguyen

(57) ABSTRACT

The invention relates to a device for communicating with a system (1, 17). Said device has mobile communication means (12, 27) for a cabled or wireless data exchange with the system (1, 17) and an emergency-stop button (4, 20) integrated into an emergency-stop part (11, 26), with said emergency-stop part (11, 26) being hard-wired to the system and forming, permanently coupled to the mobile communication means via a mechanical coupling link, a portable functional unit serving to perform mobile operator control and monitoring functions.

11 Claims, 2 Drawing Sheets

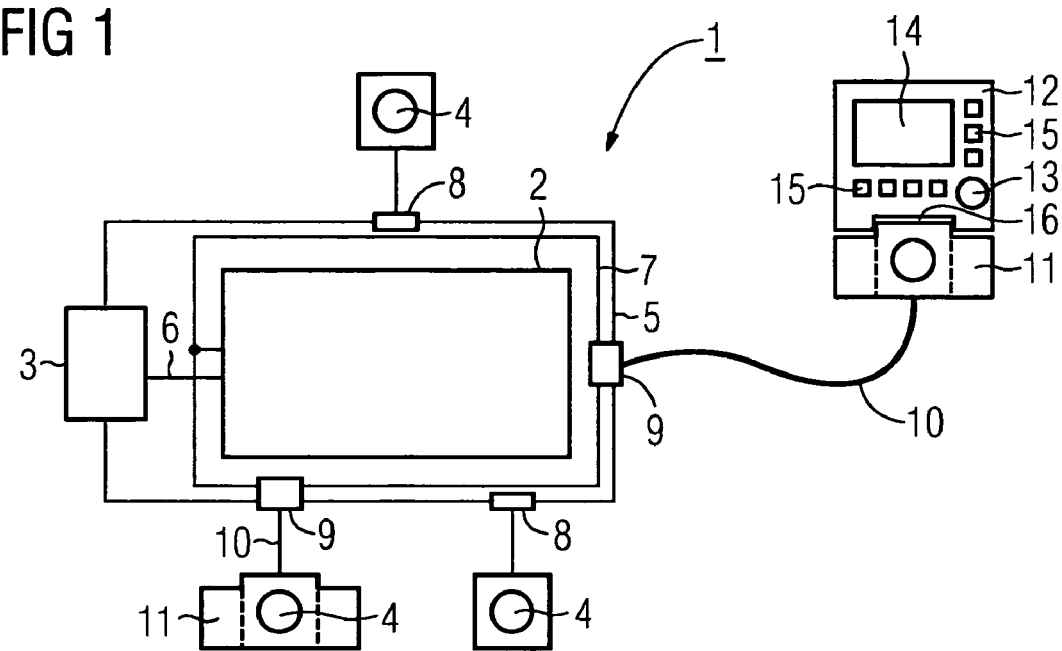
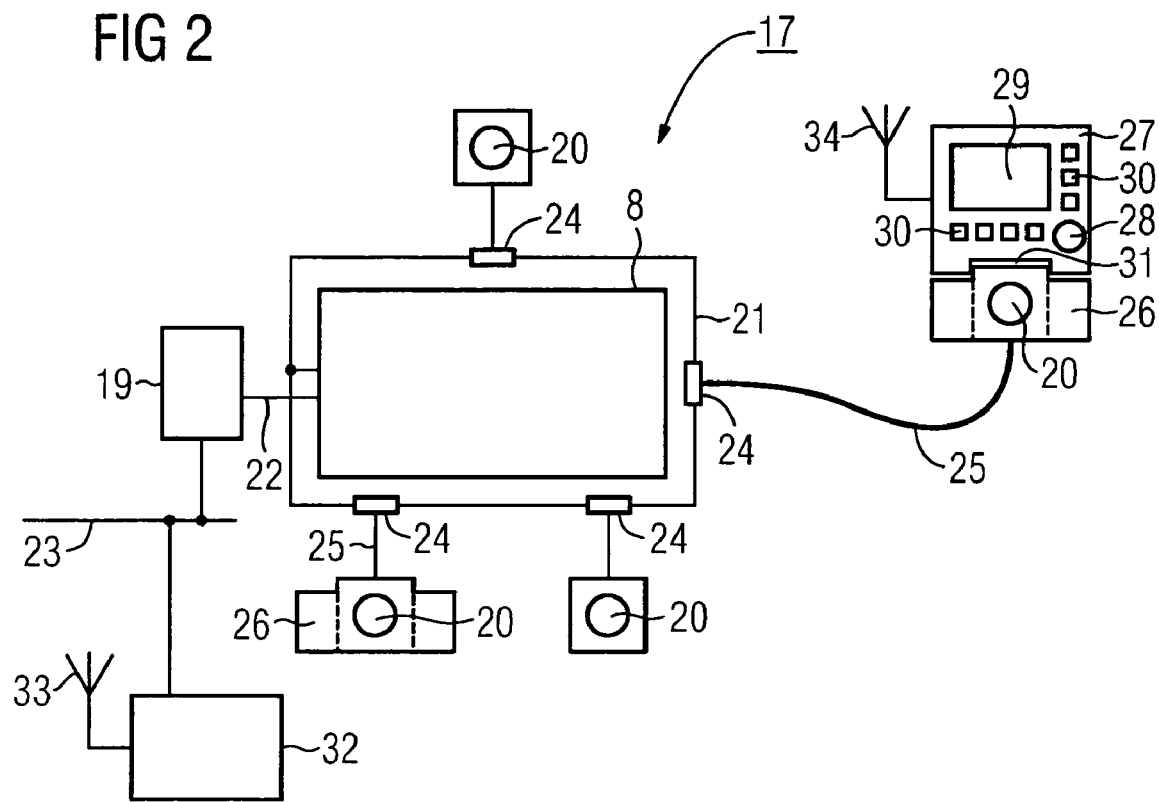

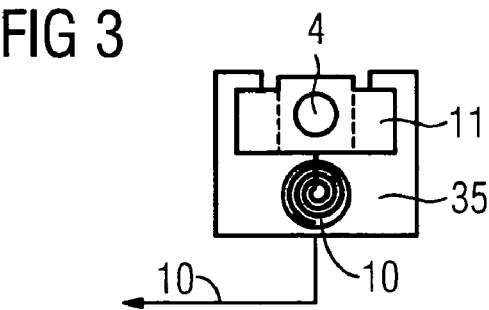
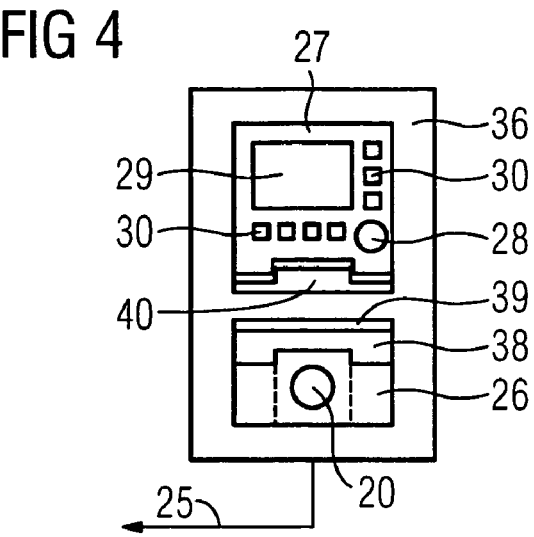
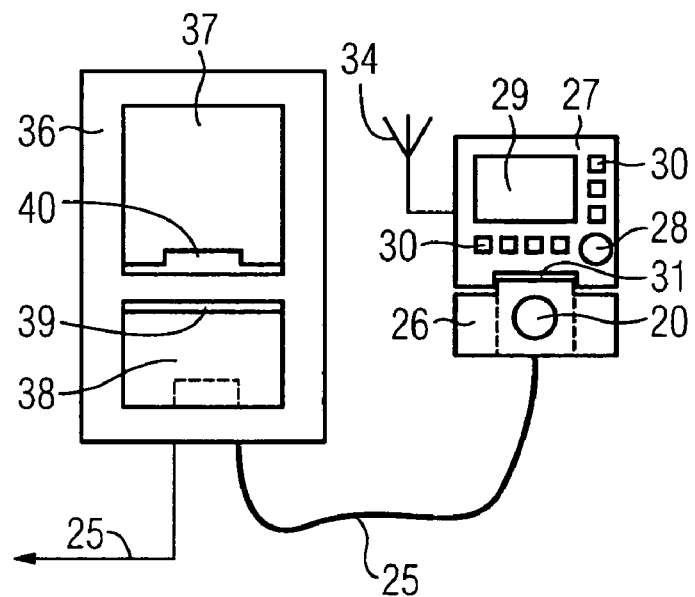

DEVICE FOR COMMUNICATING WITH A SYSTEM

CROSS REFERENCE TO RELATED APPLICATIONS

This application claims priority to the German application No. 10 2004 050 908.5, filed Oct. 19, 2004 and which is incorporated by reference herein in its entirety.

FIELD OF INVENTION

The invention relates to a device for communicating with a system, in particular for operator control and monitoring of an automation or production system or a machine.

SUMMARY OF THE INVENTION

Automation and production systems, process plants, and machines, referred to below collectively as "systems" for short, are controlled and monitored via operator control and monitoring means. Examples of operator control or input means include pushbuttons, rotary buttons, keyboards, and touch-sensitive screens that allow the system operator to influence the system. Examples of monitoring or output means include control lamps and alphanumeric or graphic displays that signal system statuses to the operator. For operator control and monitoring purposes, modern systems as a rule have compact, computer-controlled, graphic, screen-based means into which input and output functions are integrated and which communicate with the system via defined interfaces. Said operator control and monitoring means will be referred to below collectively as "communication means" for short.

Communication means can be permanently connected to the system, meaning that data is exchanged via a permanently installed connecting lead. Through distributed connecting points in the vicinity of the system, communication means of said type can also be employed as mobile and portable devices. The specific communication means is in this case connected to the relevant connecting point's interface and, after being logged onto the system, will be available for operator control and monitoring functions. The communication means is herein as a rule permanently connected to a cable, and plug-in connections at the connecting point are used for connecting to the system.

Wirelessly operating communication means can also be used to avoid the cabling expenditure for connecting points or, as the case may be, to increase the degree of freedom in terms of mobility and portability. One or more transmitting and receiving units are in this case permanently connected to the system. The battery-operated communication means exchange data with the assigned transmitting and receiving units via radio links, in this way facilitating an operator control and monitoring station that is flexibly portable within the radio link's range.

Systems have to be provided with stop buttons to comply with various industrial standards and specifications. The European EN 60204-1 standard distinguishes various categories for stop functions: Stopping is defined in category 0 as an uncontrolled system shutdown through immediate disconnection of the power supply, in category 1 as a controlled shutdown through interruption of the power supply after the system has been shut down, and in category 2 as a controlled system shutdown with the power supply not being interrupted after the system has been shut down. Only stopping according to category 0 is permitted as an emergency stop and must be identified as such in keeping with the standard. It must operate autonomously independently of the communication means.

As well as graphic display screens and operator buttons, communication means, in particular what are termed HMI (Human-Machine Interface) panels, also have keys that effect stopping or, as the case may be, emergency stopping of the system. Since the communication means are connected to the system either at defined connecting points therein via a separate cable that is as a rule pluggable and transmits data serially, or via a radio link, and autonomous operation is consequently not unfailingly ensured, an emergency-stop function and corresponding identification according to the standard is not permissible. That is why an emergency stop button identified as such has to date been dispensed with on the communication means, and communication means, in particular HMI panels, exclusively have standard stop buttons which then trigger often controlled and hence software-supported stopping.

In practice it is in the main not possible to tell which stopping sequence will be triggered when said stop buttons are actuated. Given suitable programming, this sequence is perfectly capable of producing the same effect as an emergency stop. The problem arises therefrom that a large number of users, in particular with changing personnel, will not know the precise effect of the stop buttons and, when confronted with a hazard, will look for an emergency-stop button instead of actuating the stop button.

The problem where the difference between stop and emergency-stop buttons is concerned is therefore in this case less a matter of effect and more one of discernibility. A further problem arises from the constant activity and availability of stop buttons having an emergency-stop function. They have to operate independently reliably and autonomously. Stop buttons on a communication means cannot provide such assurance. Compared to hard-wired emergency-stop sequences, communication means as such and their communication mechanisms are more fault-prone owing to their greater complexity. This proneness to faults is further exacerbated by extensive system-specific software implementations. To an extent massive limitations thus arise from the availability of the communication means themselves or of the communication links or, as the case may be, from the software.

An apparatus in which the handling of a mobile communication means in terms of relevance to safety is simplified is disclosed in an earlier application. Radio-based communication is described with a system in which an emergency-stop button that is identified in compliance with the standard and looped into a secure emergency-stop circuit is located in a receptacle for charging the radio-based communication means (docking station). When the communication means has been placed in the docking station, said apparatus constitutes a stationary operating unit having an emergency-stop button. Said operating unit conforming to the standard is disadvantageously immediately resolved again into its constituents when the communication means is removed from the docking station.

The object of the present invention is to disclose a device for communicating with a system which device, in a manner enabling straightforward production and easy handling, will allow a communication means operating either using fixed cabling or wirelessly to be equipped with an emergency-stop function in conformity with the relevant industrial standards and which, at least in a defined operator control and monitoring area, will form a mobile and portable functional unit. Owing to the spatially changing operator control and monitoring functions for communication means, the portable functional unit equipped with an emergency-stop button must also be embodied as being capable of being resolved again into its constituents.

Said object is achieved according to the invention by means of a device for communicating with a system which device has at least one mobile communication means that exchanges data with the system and at least one emergency-stop button and is characterized in that the emergency-stop button is integrated into an emergency-stop part, with said emergency-stop part being hard-wired to the system and forming, permanently coupled to the mobile communication means via a mechanical coupling link, a portable functional unit serving to perform mobile operator control and monitoring functions. The emergency-stop part is of compact design and consists essentially of a housing, the emergency-stop button, and connecting means. The mechanical coupling link can be released on completion of the operator control and monitoring functions and the communication means then connected to other emergency-stop parts in order to perform further operator control and monitoring functions in their vicinity.

A quick-to-produce, easy-to-handle functional unit is the highly advantageous outcome of the compact design of the emergency-stop part which will accommodate itself ergonomically to the mobile communication means. A major advantage of said functional unit is that requirements both for conformity with standard and for mobility can be met therewith. System monitoring is rendered more reliable and mistaken use of the wrong button in hazard situations will be precluded because the emergency-stop button can be marked and identified as such. Permanently connecting the emergency-stop part and emergency-stop button to the system ensures that the emergency-stop button for stopping the system will remain looped into the emergency-stop circuit in both the coupled and the decoupled condition and so will always be active as a stop function. This is a major advantage compared to mobile communication means in current use having stop buttons that are connected to system sockets via plugs on the cable ends. The stop buttons on the mobile communication means will also become inactive when said connection is released. In the inventive device said releasable interface is now relocated to between the stop function and another operator control and monitoring function.

In a preferred embodiment the above-described device is employed in conjunction with a mobile communication means that communicates with the system wirelessly and in a radio-based manner. Owing to the wireless radio-based communication, no further measures are necessary after the communication means has been coupled to the emergency-stop part since both parts operate mutually autonomously but, owing to the mechanical coupling, form an ergonomic operating unit conforming to the standard.

In a particularly preferred embodiment the coupling link between the emergency-stop part and communication means is also suitable for transmitting electrical data. The communication means will hence according to the invention be able to communicate with the system over the emergency-stop part. This is advantageous particularly in connection with the use of cabled communication means; this is because the connection of an otherwise necessary separate communication lead can be dispensed with, communication taking place over the emergency-stop part and the cable running between the emergency-stop part and the system. Owing to the as a rule serial data transmission, the lead's flexibility will not be restricted even when additional use is made of the cable by the communication means. Contrary-to-standard system operation will not be possible, moreover, as the emergency-stop part and communication means can in this case only be operated as a unit. A cabled communication means will also be particularly easy to handle in this embodiment; in the coupled condition there will be no restrictions whatever in this functional unit compared to wired communication means. Communication between the communication means and emergency-stop part is also advantageous when a wireless and radio-based communication means is coupled to the emergency-stop part because, for example, stop buttons that are located on said communication means and have the same stop function as the emergency stop can be looped into the cabled emergency-stop circuit, thereby ensuring a secure function independently of the quality of the data exchange between the communication means and the receiving and transmitting unit.

A further preferred variant results from permanently connecting the emergency-stop part to the system via a flexible and not permanently installed lead or via a combination of permanently installed and flexible lead. An operating unit formed from the emergency-stop part and communication means which unit conforms to the standard and is mobile can easily be provided thereby in the area defined by the flexible lead's free length.

In a further preferred embodiment the emergency-stop part communicates with the communication means in the coupled condition via the coupling link. This will, for example, advantageously allow the emergency-stop button itself to be monitored by the communication means and faults or, as the case may be, triggering of the emergency-stop button to be displayed on the communication means.

In a particularly preferred embodiment the mobile communication means can in the coupled condition be powered via the coupling link and the flexible connecting lead to the system. This would enable the useful life of battery-operated communication means to be substantially increased; recharging in a docking station could be dispensed with. A separate power supply could advantageously be dispensed with in the case of cabled communication means.

In a further variant the communication means has a holder that holds the emergency-stop part, including the cable, in the condition decoupled from the communication means. If the holder is located in the immediate vicinity of the system, a further "standard" and active emergency-stop button will in this way be advantageously provided adding to the several already permanently mounted, as a rule, in the system's vicinity. Secure ordering systems will be readily provided via suitable and sufficiently known holding devices for the cable such as, for example, self-winding devices.

Docking stations required to perform various tasks are known for communication means operating wirelessly and on a radio basis. The communication means's log-on procedures for the relevant system or recharging of said device's internal batteries are carried out via docking stations, for example. In an advantageous embodiment the above-described holder is integrated into a docking station of said type. The emergency-stop part can in this way be placed in the docking station in the condition decoupled from the communication means. The emergency-stop part will, when removed, remain connected to the system via a flexible lead between the docking station and emergency-stop part. In this case the emergency-stop part's connecting cable is permanently installed between the system and docking station and is connected to the flexible cable in the docking station or, as the case may be, holder. In other cases the emergency-stop part is connected to the system directly and without further clamping points via a flexible cable. It can be advantageous here that the cable path of the emergency-stop part taken from the holder is not routed via the docking station.

In further variant embodiments the communication means and the emergency-stop part are each employed as such. The advantages will correspondingly emerge from the above-described embodiments for the device.

The advantages achieved by means of the invention consist particularly in providing a possibility of combining mobile communication means and an emergency-stop button in such a way as to produce a mobile functional unit whose position can be changed within the defined area and which can provide an emergency-stop function conforming to the standard. From the viewpoint of, in particular, security aspects, a functional unit results which is highly available and hence can be safely used in hazard situations. Mistaken use of the wrong button is virtually precluded because identifying in keeping with the standard is rendered possible.

A further advantage is that the operating principle and functioning mode are almost the same for cabled and for wireless communication means so that operator errors in the case of mixed systems due to different types of operation can be precluded.

Exemplary embodiments of the invention are explained in more detail below with the aid of drawings.

BRIEF DESCRIPTION OF THE DRAWINGS

FIG. 1 shows, by way of example, a system having a cabled communication means and a coupled emergency-stop part, FIG. 2 shows, by way of example, a system having a wireless, radio-controlled communication means and a coupled emergency-stop part, FIG. 3 shows, by way of example, a holder for an emergency-stop part, FIG. 4 shows, by way of example, a docking station having a wireless, radio-controlled communication means placed therein, and FIG. 5 shows, by way of example, a docking station having a radio-controlled communication means removed therefrom.

Mutually corresponding parts have been identically referenced in all the Figures.

DETAILED DESCRIPTION OF THE INVENTION

The system 1 shown in FIG. 1 is connected to the mobile cabled communication means 12 and exchanges data therewith for controlling and monitoring the system 1. The system 1 includes a machine 2 connected to a control means 3 controlling the machine 2 via a control circuit 6. The system 1 furthermore has an emergency-stop circuit 5 arranged around the machine 2 and a communication circuit 7 arranged around the machine 2. The emergency-stop circuit 5 is permanently connected at various points to the connecting points 8 and 9. The communication circuit is permanently connected only to the connecting points 9. One emergency-stop button 4 in each case is permanently connected via a connecting point 8. Owing to the connection of the connecting points 9 to the emergency-stop circuit, emergency-stop buttons 4 can also be connected to these points. The actuation of any emergency-stop button 4 will result in the uncontrolled shutdown of the machine 2 through immediate disconnection of the power supply to the machine-drive elements.

The emergency-stop parts 11 are permanently connected to the system at the connecting points 9 via the flexible connecting lead 10. The emergency-stop part 11 has a housing into which an emergency-stop button 4 is integrated. The emergency-stop button 4 is identified according to the industrial standard. The emergency-stop part 11 furthermore has a coupling link 16 via which the communication means 12 is mechanically connected to the emergency-stop part 11 and can be released again. The coupling link 16 can additionally be embodied also for electrically connecting the communication means 12 and the emergency-stop part 11. Corresponding contact elements are integrated into the coupling link 16 for electrical contacting. Mechanical retention means, not described in more detail here, are provided for securing the coupling link 16 against accidental release. When a cabled communication means is connected, data is transmitted from the communication means 12 to the control means 3 and back and, if necessary, powering of said communication means 12 is provided via the coupling link 16, the flexible connecting lead 10, and the connecting point 9. The emergency-stop button 4 in the emergency-stop part 11 is furthermore looped into the emergency-stop circuit 5 via the flexible connecting lead 10. Data from the emergency-stop sequence such as, for example, triggering of the emergency-stop button 4 in the associated emergency-stop part 11 or monitoring of the emergency-stop circuit 5, can furthermore be routed to the directly connected communication means 12 via the coupling link 16. The entire communication path from the communication means 12 to the control means 3 of the machine 2 can only be released via the coupling link 16; all other connections are hard-wired. This ensures that the functional unit formed from the emergency-stop part and communication means will always offer a functioning emergency-stop button. As shown in FIG. 1, the mobile communication means 12 has, by way of example, input and output means in the form of the screen 14 and the buttons 13 and 15 via which all operations relevant to operator control and monitoring can be performed. The stop button 13 shown therein can in the embodiment shown serve to effect a controlled shutdown of the system. Confusion with the emergency stop is precluded as the emergency stop is identified as such. The mobile communication means 12 can be easily separated again from the emergency-stop part 11 via the coupling link 16 without affecting the functioning of the emergency-stop button 4 on the separated emergency-stop part 11. The communication means 12 can be connected at another position to another emergency-stop part 11 for operator control and monitoring purposes.

FIG 2 shows a system assembly similar to that shown in FIG. 1 having a wireless, radio-based mobile communication means 27 which also exchanges data for controlling and monitoring the system 17. The system 17 includes a machine 18 connected via a control circuit 22 to a control means 19 controlling the machine 18. The control means 19 is coupled via the cabled communication circuit 23, via which it is possible to communicate between the control means 19 and transmitting and receiving unit 32, to said transmitting and receiving unit 32. A radio link via which further communication between the communication means 27 and transmitting and receiving unit 32 is facilitated is maintained via the antenna 33 of the transmitting and receiving unit 32 and the antenna 34 of the communication means 27. The system 17 furthermore has an emergency-stop circuit 21 having connecting points 24 that are distributed around the machine and permanently connected to the emergency-stop circuit. In each case one emergency-stop button 20 or one emergency-stop part 26 is permanently looped into the emergency-stop circuit 21 via a connecting point 24. The emergency-stop part 26 has a housing into which an emergency-stop button 20 is integrated and means for mechanically and electrically coupling link 31 to the communication means 27. The emergency-stop part 26 can be mechanically connected to the communication means 27 via the coupling link 31. The coupling link 31 can additionally be embodied also for an electrical connection between the communication means 27 and emergency-stop part 26. Corresponding contact elements are provided in the coupling link 31 for electrical contacting; the coupling link 31 is furthermore safeguarded against accidental release due to, for example, a locking retention system. The emergency-stop part 26 is permanently connected to the flexible connecting lead 25, which is in turn permanently connected on the other side of the cable to the connecting point 24; the emergency-stop button 20 of the emergency-stop part 26 is hence looped into the emergency-stop circuit and is active, functioning autonomously, in the condition both coupled to the communication means 27 and decoupled therefrom. The actuation of any emergency-stop button 20, including those in the emergency-stop part 26, will result in the uncontrolled shutdown of the machine 18 through immediate disconnection of the power supply; the emergency-stop buttons 20 are identified as such according to the industrial standard.

In contrast to the system configuration shown and described in FIG. 1, the exchange of data via the coupling link 31 is restricted to monitoring the emergency-stop circuit 21 or, as the case may be, releasing the emergency-stop button 20 integrated into the coupled emergency-stop part 26. Moreover, the stop button 28 on the communication means 27, for example, could additionally be looped into the emergency-stop sequence. AC powering of the otherwise battery-operated communication means 27 via the flexible connecting lead 25 would also be conceivable in the coupled condition.

FIG. 3 is a schematic of a holder 35 for the emergency-stop part 11, 26. The holder 35 is permanently attached to the machine 2, 17 or in the vicinity of thereof. The holder is essentially a receptacle into which the emergency-stop part 11, 26 can be placed, inserted, or pressed. The emergency-stop button can be operated like a conventional emergency-stop button once the emergency-stop part 11, 26 has been put into the receptacle. The flexible connecting lead 10, 25 will, when this is done, be held by a suitable ordering system not described in more detail here. An ordering system of such type can be, for example, a separate receptacle container or self-winding cable drum.

FIG. 4 and FIG. 5 show an embodiment for a mobile, radio-based communication means in conjunction with a docking station. In FIG. 4 the communication means 27 and the emergency-stop part 26 have been placed in the provided receptacles 37, 38 of the docking station 36. When this is done, the mobile communication means 27 makes contact in the customary and known manner with the docking station 36 in order to contact the interfaces provided for example for external storage media, external input/output means, or the power supply unit in said docking station 36. All the points of contact of the coupling link 31 between the communication means 27 and emergency-stop part 26 in the contact means 40 are furthermore shown. The docking station 36 additionally has a receptacle 38 for the emergency-stop part 26. Said receptacle 38 performs the same function as the holder described under FIG. 3 for the emergency-stop part 26. The receptacle holds the emergency-stop part 26 and the flexible connecting cable 25. The receptacle 38 additionally offers a possibility of contacting between the emergency-stop part 26 and docking station 36 via the contact means 39. This ensures that the same function as in the case of direct coupling of the emergency-stop part 26 and communication means 27 will be provided when the communication means 27 and the emergency-stop part 26 has been placed in the receptacle.

FIG. 5 shows the direct coupling of the emergency-stop part 26 and the communication means 27 in conjunction with the use of a docking station 36. Both the emergency-stop part 26 and the communication means 27 can be removed from the docking station while operation is in progress. The two are connected to each other both mechanically and, where applicable, electrically via the coupling link 31, thereby forming a mobile functional unit. The receptacle 38 releases the flexible connecting lead 25.

In an embodiment not shown here the connecting lead 25 can be completely removed from the receptacle 38. In this case the mobile functional unit formed from the communication means 27 and emergency-stop part 26 would no longer be connected to the system 17 via the docking station 36 but directly.

The invention claimed is:

1. A device for communicating with a system, comprising:
at least one mobile communication mechanism for exchanging data with the system; and
at least one emergency-stop button, wherein the emergency-stop button is integrated into an emergency-stop part, and wherein the emergency-stop part is hard-wired to the system and forms, permanently coupled to the mobile communication mechanism via a mechanical coupling link, a portable functional unit for performing mobile operator control and monitoring functions, wherein the emergency-stop part is permanently connected to the system via an at least partially flexible and not permanently installed connecting lead.

2. The device as claimed in claim 1, wherein the communication mechanism communicates wirelessly with the system.

3. The device as claimed in claim 1, wherein the communication mechanism is electrically connected to the emergency-stop part via a coupling link and communicates with the system via the coupling link.

4. The device as claimed in claim 2, wherein the communication mechanism is electrically connected to the emergency-stop part via a coupling link and communicates with the system via the coupling link.

5. The device as claimed in claim 1, wherein the emergency-stop part is adapted to communicate with the communication mechanism in a coupled mode via the coupling link.

6. The device as claimed in claim 1, wherein the communication mechanism is adapted to be powered in a coupled mode via the coupling link and a connecting lead.

7. The device as claimed in claim 1, further comprising a holder for holding the emergency-stop part and a connecting lead in a condition decoupled from the communication mechanism.

8. The device as claimed in claim 7, wherein the holder is integrated into a docking station.

9. A mobile communication mechanism for communicating with a system, wherein the mobile communication mechanism can be permanently coupled via a mechanical coupling link to an emergency-stop part and can together therewith form a portable functional unit serving to perform mobile operator control and monitoring functions, and wherein the emergency-stop part is permanently connected to the system via an at least partially flexible and not permanently installed connecting lead.

10. The mobile communication mechanism as claimed in claim 9, characterized in that the mobile communication mechanism can be electrically coupled via a coupling link to the emergency-stop part and communicates with the system via said part.

11. The mobile communication mechanism as claimed in claim 10, wherein the mobile communication mechanism is capable to be powered in a coupled condition via the coupling link.

* * * * *